Oct. 28, 1969    C. F. BATCHELDER ET AL    3,474,478
STITCHED ADHESIVE TAPE RELEASABLE ATTACHING METHOD
Filed May 9, 1968    2 Sheets-Sheet 1
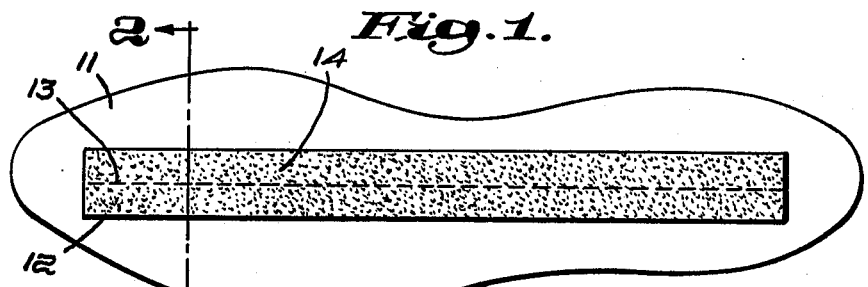
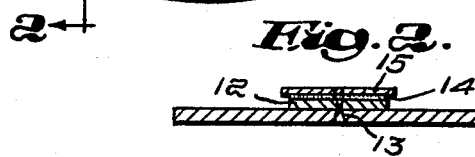
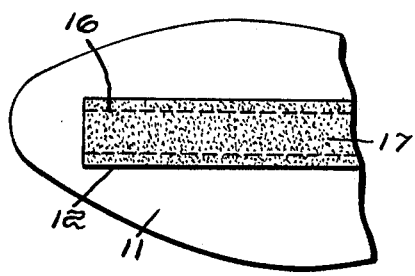
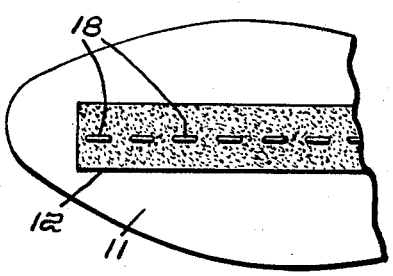
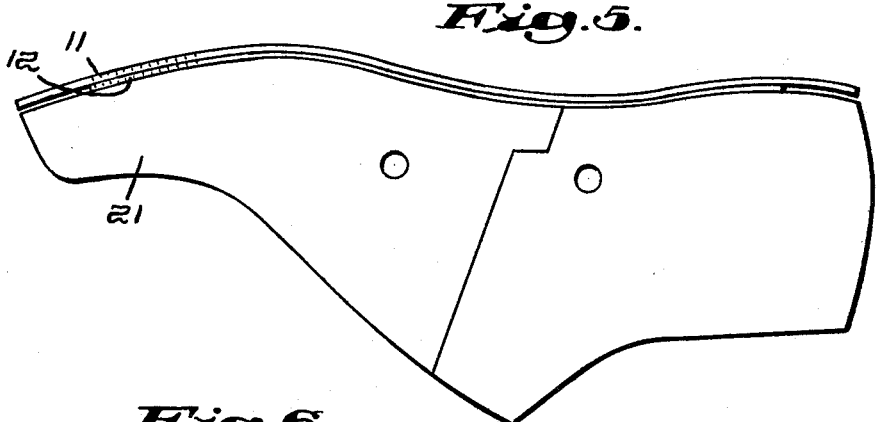
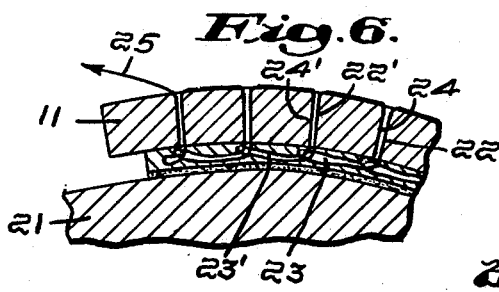
Inventors:
Charles F. Batchelder,
Jerome A. Rubico,
by Russell, Chittick & Pfund
Attorneys Oct. 28, 1969　　　C. F. BATCHELDER ETAL　　　3,474,478
STITCHED ADHESIVE TAPE RELEASABLE ATTACHING METHOD
Filed May 9, 1968　　　　　　　　　　　　　　　2 Sheets-Sheet 2
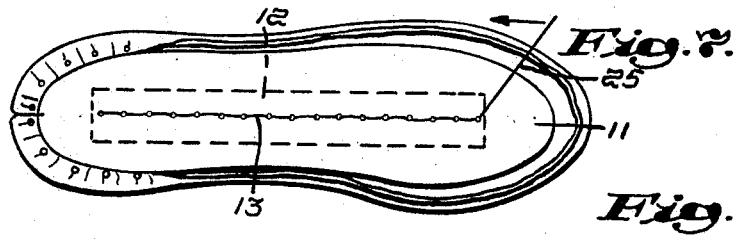
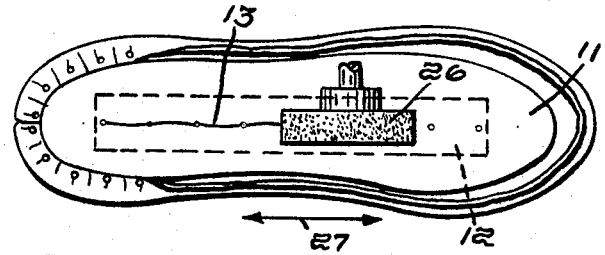
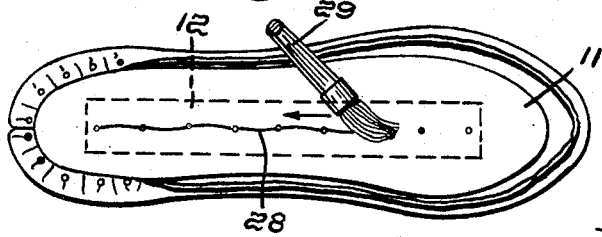
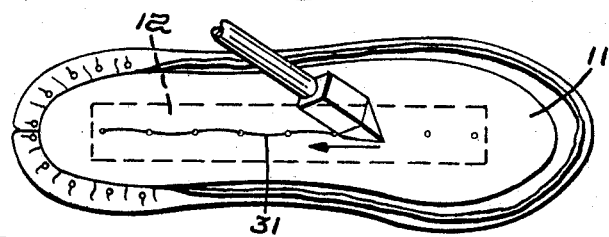
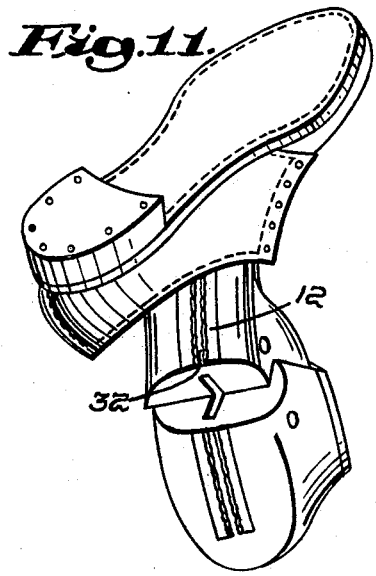
Inventors:
Charles F. Batchelder,
Jerome A. Rubico,
by Russell, Chittick & Pfund
Attorneys

United States Patent Office 3,474,478
Patented Oct. 28, 1969

3,474,478
STITCHED ADHESIVE TAPE RELEASABLE ATTACHING METHOD
Charles F. Batchelder, Milton, and Jerome A. Rubico, Boston, Mass., assignors to Batchelder-Rubico, Inc., Boston, Mass., a corporation of Massachusetts
Filed May 9, 1968, Ser. No. 727,949
Int. Cl. A43d 11/08
U.S. Cl. 12—142                              8 Claims

ABSTRACT OF THE DISCLOSURE

A manufacturing process for temporarily holding two articles together and readily releasing them exemplified in the manufacture of shoes by stitching a single face pressure sensitive adhesive tape to the inner side of the insole with the adhesive exposed and spotting the insole on the last to be held by the adhesive. The attachment is released by destroying the stitching before sole laying or by ripping the tape along the stitch line during last pulling.

Cross references to related applications

This application is related generally to the field of applicant's prior Patents No. 3,257,677 and 3,257,678 and to co-pending application, Ser. No. 607,053, filed Jan. 3, 1967.

Background of the invention

This invention relates generally to manufacturing processes in which articles are required to be temporarily joined during an initial phase of the manufacturing process and subsequently separated.

In the prior art various arrangements for joining articles during manufacturing processes have been provided and are exemplified in the shoe manufacturing industry by the temporary attachment of an insole or other portions of the shoe sometimes referred to as "lasting means" to the shoe last while the shoe is being manufactured and the subsequent removal of the last from the finished shoe by the last pulling operation which requires that the bond which initially held insole to the last be destroyed. In conventional shoe manufacturing this operation for destroying the bond is referred to as tack knocking since the insole is initially attached to the last by a number of tacks driven through the insole and into the wooden body of the last. Tacking and tack knocking as a means for temporarily attaching an insole to a last have a number of disadvantages inasmuch as the tacks are driven into the last and thereby damage the wood structure to the point where the last has to be refurbished after a limited period of use. There is also the possibility of leaving a tack in the shoe which represents a dangerous condition for the ultimate customer to encounter. The primary disadvantage of prior art tacking and tack knocking operations however is the time-consuming nature of the steps which must be performed and hence consequent cost which is added to the finished product.

Summary

The present invention provides for the temporary attachment of two members by using a single-face, pressure-sensitive adhesive tape which is stitched to one of the members with the adhesive side of the tape exposed. With this arrangement the members can be joined by pressing them into contact and the structural system, which thereby holds the parts together, consists of the adhesive bond to one of the layers, the substrate or body stock of the adhesive tape, which supports the adhesive bond and is adhesively attached thereto as the tape is received from the tape manufacturer and the stitches which pass through the tape and into the other part. In the disclosed embodiment the stitches hold the tape firmly to the insole and the tape is adhesively bonded to the last. With this arrangement several possibilities for destroying the integrity of the bonding system are possible. If the tape stitching is destroyed either by abrading the exposed stitches or by chemical or heat action on a stitching formed of suitable materials to be responsive to either chemical action or elevated temperatures, the lasted shoe can be separated at last pulling with the tape adhering to the last and pulling completely free of the shoe due to the destruction of the stitching attachment. For this purpose it will generally be required that the stitching be destroyed before the outsole is laid since it will ordinarily be necessary to directly apply the destruction action to the line of stitching on the insole. When so destroyed from the outsole side of the insole the stitching will ordinarily pull through the perforations through the insole and the portions of the destroyed stitches will be withdrawn with the tape adhered to the last. If desired a chain stitch type of stitching can be used which can be unraveled by pulling a thread from the outsole side of the insole, in which case, the integrity of the stitching is destroyed by pulling the chain stitched thread which readily pulls through the perforations in the insole and the delasting pulls the tape from the shoe adhered to the last.

In this process any of various forms of stitching can be used. Thread or synthetic filament stitches which can either be unraveled or must be physically destroyed can be used and if physical destruction of the threads is to take place other stitching materials such as metal wire are suitable. Synthetic substances capable of destruction by elevated temperatures or chemical action can be used with the bond destroyed by the application of either a solvent or heat sufficient to destroy the stitch bond. In addition the bond can be destroyed without previous conditioning by leaving the stitching intact until last pulling when the bond will be destroyed by ripping the tape along the stitch line. In this later case the thread remains in the shoe and may be covered by a sock lining, if desired.

It will also be apparent that the invention is not limited to the application of an insole to a last but can be applied for the attachment of various other parts of the shoe such as a heel tuck, a lasting plug and various parts as well as the attachment of parts generally in other manufacturing operations not related to shoe manufacture. Where used in the specification and claims, the words "insole" and "last" should be interpreted to include these definitions.

Brief description of the drawing

FIG. 1 is a plan view of an insole with a single-face, pressure-sensitive strip of tape stitched thereto;

FIG. 2 is a sectional view taken on line 22 of FIG. 1;

FIG. 3 is a fragmentary view similar to FIG. 1 but showing a double line of stitching;

FIG. 4 is a fragmentary view showing an alternate form of stitching such as metal staples;

FIG. 5 is a side elevation of a last with insole temporarily attached in accordance with the invention;

FIG. 6 is a greatly enlarged view of a portion of the insole attached to a last and showing the particulars of an unravel type of stitch;

FIG. 7 is a view of a shoe just prior to outsole laying illustrating the method of destroying the bond to the last by pulling an unraveling thread;

FIG. 8 a view similar to FIG. 7 showing destruction of the thread by abrading;

FIG. 9 is a view similar to FIG. 7 showing destruction of a thread by the application of a chemical solvent or the like;

FIG. 10 is a view similar to FIG. 7 showing the destruction of the thread by the application of heat; and FIG. 11 is a view showing last pulling from a finished shoe and illustrating destruction of the bond between the insole and the last by ripping the adhesive tape at the thread line.

Description of the preferred embodiments

Referring now to FIG. 1 an insole 11 is shown representing a part of a finished product which is to be initially temporarily attached to another part during the manufacturing process. In preparation for this attachment a strip of single-face, pressure-sensitive adhesive coated tape 12 is attached to the insole 11 by a line of stitching 13. In its simplest form the tape 12 can be attached to the insole 11 by sewing directly to the insole on an ordinary sewing machine with Teflon or other non-adhering type coating on the portions of the sewing machine which come in contact with the exposed surface of the tape 12. If an unraveling type stitch is to be used the tape must be sewed such that the thread which is pulled to unravel the stitch is available from the opposite side to the side shown in the view of FIG. 1. As shown in FIG. 2 the insole 11 has the strip of tape 12 stitched thereto by threads 13 which pass through both the tape 12 and the insole 11. The tape 12 has a thin layer of pressure-sensitive adhesive coating 14 thereon and for this purpose paper tape such as that generally designated as masking tape is suitable for the strip 12. If desired, a strip of release paper 15 may be applied to cover the adhesive 14 during the manufacturing operation prior to making adhesive bond to the shoe last. The release paper 15 may be applied before or after the stitching 13 attaches the tape strip 12 to the insole 11. Generally, if the tape 12 is unwound from rolls with the release paper liner interposed between layers of tape in the roll, the stitching 13 will be applied through the release paper 15 as shown in FIG. 2 and the precautions respecting the non-adhesive characteristics of the sewing machine will not be necessary. On the other hand, if a release paper 15 is not desired, the insoles after the tape 12 has been sewed thereto can be stored in trays with a protective cover sheet thereover to preserve the exposed adhesive until it is applied to the shoe last.

FIG. 3 shows an alternative arrangement of the stitching in which a double row of stitches 16 and 17 is used to attach the adhesive tape 12 to the insole 11.

FIG. 4 is a view similar to FIG. 3 but with the tape 12 attached to the insole 11 by a metal wire type of stitching such as staples 18, FIG. 5 shows the insole 11 attached to a last 21 by means of the adhesive bond of layer 14. This operation is accomplished by spotting the insole 11 at the appropriate position and merely applying palm pressure by the operator to effect the pressure sensitive adhesive bond to the bottom of the last 21. In each instance the tape strip 12 is attached to the insole 11 by some form of stitch as previously described.

Referring now to FIG. 6 the details of the attachment of the insole 11 to the last 21 are shown for a chain stitch. The tape 12 is sewed to the insole 11 by a chain stitch which is capable of being unraveled. Specifically, this stitch is sewed by carrying a thread portion 22 downwardly to the insole 11 and through the tape 12, laying an advanced loop 23 horizontally and withdrawing the thread portion 24 out through the same hole which pierced the insole 11 and tape 12. The next stitch is sewed with the portion 22' passing downward through the insole and tape and laying the loop 23' through the loop 23 with the portion 24' returning to the same hole as before. Thus it can be seen when the thread portion 25 is pulled in the direction of the arrow the loop portions 23 are successively removed from the preceding loop and the stitch is capable of being unraveled. Obviously other sitches capable of unraveling can be used so long as the unraveling thread is exposed on the side of the insole 11 opposite that to which the tape 12 is attached.

Referring now to FIGS. 7 through 10, the various methods for destroying the structural integrity of the bond between the insole and the last will be described where such destruction occurs prior to outsole laying. A shoe in this condition is shown in FIG. 7 with the tape 12 indicated as lying underneath the visible surface of the insole 11. In this intermediate manufactured state for the lasted shoe the only portion of the temporary attachment system which is visible is the thread line 13, which has been sewed through the insole 11. Where a chain stitch or other unraveling stitch has been used a pull on the thread portion 25 indicated in FIG. 7 will unravel the stitch and leave the last and the inner surface of the insole in condition to be separated. Where a stitch which will not unravel is used or where metal wire stitching has been employed some form of cutting, abrading or other physical destruction of the thread line 13 will be required and this is illustrated in FIG. 8. Here a rotating abrasive wheel 26 is contacted by the lasted shoe which is moved back and forth in the direction of the doubleheaded arrow 27 to destroy the effectiveness of the stitch line 13.

Similarly, where special composition threads are used, such as a soluble basting bobbin thread as manufactured by the Solvex Corporation of Louisville, Ky., the integrity of a lock stitch in maintaining the bond may be destroyed by the application of suitable solvent such as the cleaning fluids perchlorethylene or trichlorethylene as indicated in FIG. 9 being applied by brush 29. Other forms of the soluble thread 28 may be employed. Nylon filament threads such as 31 shown in FIG. 10 and other heat responsive threads and filaments may be used for the stitch line and destroyed by the application of heat, such as by use of a torch or a heated iron on the thread or otherwise heating to the destruction temperature for the thread.

Shown in FIG. 11 is an alternate way of destroying the structural integrity of the bonding system in which the tape 12 is ripped at 32 by merely performing the delasting operation without having previously destroyed the stitch line which holds the thread to the insole. This procedure is acceptable where a sock lining is to be placed in the shoe or otherwise where the retention of the thread on the part to which the tape 12 was initially stitched is not objectionable. Obviously, a soft cotton thread of small diameter is representative of the type stitch material that should be used if this method of separation is to be employed since its presence beneath the sock lining in the shoe will be wholly unnoticed. After this delasting operation, as in the case of the other figures, the remains of the tape 12 which adhere to the last can be readily peeled away prior to use of the last in the next lasting operation.

We claim:

1. The method of temporarily securing two parts together during a manufacturing sequence to permit the parts to be firmly held yet readily separated when desired comprising the steps of:

stitching a single-face pressure-sensitive adhesive tape to one of said parts, adhesive side exposed;

joining said parts by pressing the adhesive surface of said tape against a surface of the other of said parts;

proceeding with said manufacturing sequence with said parts initially bonded together by the structural elements consisting of the adhesive bond, the body stock of said tape and the stitches; and subsequently separating said parts by destroying the structural integrity of one of said structural elements other than said adhesive bond to allow said parts to be separated with the tape still adhered to the other of said parts.

2. The method of temporarily securing an insole to a shoe last during the manufacture of a shoe to permit the insole to be firmly held to the last yet readily separated therefrom during last pulling comprising the steps of:

stitching a single-face, pressure-sensitive adhesive tape on the last side of said insole with adhesive side of said tape exposed;

spotting said insole on a last and pressing the exposed adhesive of said tape into contact with the last bottom to join said insole to said last;

proceeding with the manufacture of said shoe with said insole initially held to said last by the structural elements consisting of the adhesive bond, the body stock of said tape and the stitches; and destroying the structural integrity of one of said structural elements other than said adhesive bond prior to removal of said last from said shoe.

3. The method according to claim 2 in which the structural integrity of the stitching is destroyed along the length of said insole prior to sole laying.

4. The method according to claim 3 in which said stitching comprises a stitch which can be unraveled from the outsole side of the lasted insole and said structural integrity is destroyed by pulling a thread to unravel said stitching.

5. The method according to claim 3 in which the structural integrity of said stitching is destroyed by abrading the portion of said stitching on the outsole side of said insole.

6. The method according to claim 3 in which the structural integrity of said stitching is destroyed by the application of heat.

7. The method according to claim 3 in which the structural integrity of said stitching is destroyed by the application of a solvent on the outsole side of said insole.

8. The method according to claim 2 in which the structural integrity of the body stock of said tape is destroyed by ripping along said stitching during last pulling.

References Cited
UNITED STATES PATENTS

| | | | |
|---|---|---|---|
| 1,365,221 | 1/1921 | Blake | 12—142 |
| 2,701,887 | 2/1955 | Nolan | 12—142 |
| 3,052,904 | 9/1962 | Reid et al. | 12—142 |

PATRICK D. LAWSON, Primary Examiner